United States Patent
Kruglick

(10) Patent No.: US 10,037,653 B2
(45) Date of Patent: Jul. 31, 2018

(54) PEER-TO-PEER (P2P) CODE EXCHANGE FACILITATION IN CENTRALLY MANAGED ONLINE SERVICE

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 621 days.

(21) Appl. No.: 14/376,816

(22) PCT Filed: Dec. 19, 2013

(86) PCT No.: PCT/US2013/076530
§ 371 (c)(1),
(2) Date: Aug. 5, 2014

(87) PCT Pub. No.: WO2015/094278
PCT Pub. Date: Jun. 25, 2015

(65) Prior Publication Data
US 2016/0035182 A1 Feb. 4, 2016

(51) Int. Cl.
*A63F 13/00* (2014.01)
*G07F 17/32* (2006.01)
(Continued)

(52) U.S. Cl.
CPC .......... *G07F 17/3223* (2013.01); *A63F 13/30* (2014.09); *G06F 8/61* (2013.01); *G06F 21/10* (2013.01); *G07F 17/3209* (2013.01); *G07F 17/3272* (2013.01); *H04L 63/0407* (2013.01); *H04L 67/1044* (2013.01); *H04L 67/1048* (2013.01); *H04L 67/1063* (2013.01); *H04L 67/34* (2013.01); *A63F 2300/408* (2013.01);
(Continued)

(58) Field of Classification Search
CPC .... H04L 67/06; H04L 67/104; G07F 17/3223
See application file for complete search history.

(56) References Cited

U.S. PATENT DOCUMENTS

| 4,710,873 A | 12/1987 | Breslow et al. |
| 6,003,084 A | 12/1999 | Green et al. |

(Continued)

OTHER PUBLICATIONS

Brand, S., "The Science of Apparition," in The Media Lab, Chapter 5, Viking Penguin, pp. 71-93 (Sep. 3, 1988).
(Continued)

*Primary Examiner* — David L Lewis
*Assistant Examiner* — Eric M Thomas

(57) ABSTRACT

Technologies are generally provided for a hybrid architecture of an enhanced networked environment implementing a centralized management of peer-to-peer (P2P) code exchange for secure real-time content distribution. In some examples, central game servers in a massively multiplayer online game (MMOG) service may prepare both P2P admission and eviction planning and P2P element integration packages, instructing a game client whom to send data to while also removing exploitable data from the P2P channel. Thus, large amounts of data may be offloaded from a datacenter hosting an MMOG or similar service involving high numbers of users to P2P connections.

17 Claims, 6 Drawing Sheets

(51) Int. Cl.
*H04L 29/08* (2006.01)
*G06F 8/61* (2018.01)
*A63F 13/30* (2014.01)
*G06F 21/10* (2013.01)
*H04L 29/06* (2006.01)

(52) U.S. Cl.
CPC .............. *A63F 2300/513* (2013.01); *G06F 2221/2109* (2013.01); *H04L 63/0281* (2013.01); *H04L 67/38* (2013.01)

(56) References Cited

U.S. PATENT DOCUMENTS

| | | | |
|---|---|---|---|
| 8,700,727 B1* | 4/2014 | Gole | H04L 67/104 709/213 |
| 2002/0124090 A1 | 9/2002 | Poier et al. | |
| 2006/0150249 A1 | 7/2006 | Gassen et al. | |
| 2007/0300298 A1 | 12/2007 | Goranson et al. | |
| 2009/0182815 A1 | 7/2009 | Czechowski, III et al. | |
| 2009/0193418 A1 | 7/2009 | Nye et al. | |
| 2009/0202114 A1 | 8/2009 | Morin et al. | |
| 2010/0082979 A1* | 4/2010 | Edwards | H04L 63/0428 713/168 |
| 2012/0129600 A1 | 5/2012 | Ealey | |
| 2012/0142429 A1* | 6/2012 | Muller | A63F 13/12 463/42 |
| 2012/0309520 A1 | 12/2012 | Evertt et al. | |
| 2013/0061049 A1 | 3/2013 | Irvine | |
| 2013/0144675 A1 | 6/2013 | Ellis et al. | |

OTHER PUBLICATIONS

"How Indie Devs Made an 1,800-Player Action Game Mod in Their Spare Time," posted on Sep. 15, 2012, Accessed at http://web.archive.org/web/20130421094744/http://games.slashdot.org/story/12/09/15/237202/how-indie-devs-made-an-1800-player-action-game-mod-in-their-spare-time, Accessed on Jul. 22, 2014, pp. 17.

"Just Cause 2 Multi Player," posted on Sep. 14, 2012, Accessed at http://web.archive.org/web/20131023120348/http://www.redbull.co.uk/cs/Satellite/en_UK/Article/Just-Cause-2-Multiplayer-Behind-the-scenes-with-021243257915642, Accessed on Jul. 22, 2014, pp. 5.

"Venture Beat/News About Tech, Money and Innovation," Accessed at http://web.archive.org/web/20130908055703/http://venturebeat.com/2012/02/27/total-immersion-shows-off-cool-new-augmented-reality-platform/, Accessed on Jul. 22, 2014, pp. 15.

Bowyer, K. W. et al., "A Survey of Approaches and Challenges in 3D and Multi-modal 3D+2D Face Recognition," Computer Vision and Image Understanding, vol. 101, No. 1, pp. 1-15 (2006).

Fanelli, G., and Fratarcangeli, M. "A Non-Invasive Approach for Driving Virtual Talking Heads from Real Facial Movements," In 3DTV Conference, pp. 1-4, (2007).

Fritz, B., "Netflix streams more than 1 billion hours in June," posted on Jul. 3, 2012, Accessed at http://web.archive.org/web/20130621213959/http://articles.latimes.com/2012/jul/03/entertainment/la-et-ct-netflix-billion-hours-20120703, Accessed on Jul. 22, 2014, pp. 2.

Gibbs, M., "Video fun with avatars and Skype," posted on Apr. 3, 2006, Accessed at http://www.networkworld.com/article/2310271/computers/video-fun-with-avatars-and-skype.html?page=1, Accessed on Jul. 22, 2014, pp. 2.

Gordon, W., "How to Cheat at Online Video Games," posted on Oct. 19, 2012, Accessed at http://web.archive.org/web/20131218103830/http://lifehacker.com/5953204/how-to-cheat-at-online-video-games, Accessed on Jul. 22, 2014, pp. 4.

International Search Report and Written Opinion in International Patent Application No. PCT/US2013/076530, dated May 23, 2014.

McElroy, J., "Sony shows off PS3 facial recognition tech," posted on Sep. 10, 2009, Accessed at http://web.archive.org/web/20130219021002/http://www.joystiq.com/2009/09/10/sony-shows-off-ps3-facial-recognition-tech, Accessed on Jul. 22, 2014, pp. 2.

Walsh, T., "CyberExtruder Pulls a Face in 'Second Life'," posted on Aug. 19, 2007, Accessed at http://web.archive.org/web/20090215034219/http://www.secretlair.com/index.php?/clickableclltture/entry/cyberextruder_pulls_a_face_in_second_life/, Accessed on Jul. 22, 2014, pp. 3.

* cited by examiner

PEER-TO-PEER (P2P) CODE EXCHANGE FACILITATION IN CENTRALLY MANAGED ONLINE SERVICE

CROSS-REFERENCE TO RELATED APPLICATION

This Application is the U.S. National Stage filing under 35 U.S.C. § 371 of International Application No. PCT/US13/76530, filed on Dec. 19, 2013. International Application No. PCT/US13/76530 is hereby incorporated by reference in its entirety.

BACKGROUND

Unless otherwise indicated herein, the materials described in this section are not prior art to the claims in the present application and are not admitted to be prior art by inclusion in this section.

Peer-to-peer (P2P) and client-server models are two types of frequently used data exchange models. In P2P computing, a distributed application architecture partitions tasks or content between peers, where peers may be equally privileged participants in processing the applications. The peers may make a portion of their resources, including, for example, disk storage space or network bandwidth, available to the other peers in the network. P2P computing may not need direct coordination from a central server. P2P computing differs from the client-server model, where workloads may be partitioned between servers and clients. Servers and clients communicate over a computer network on separate hardware, yet the server and client may reside in the same system. A client may not share any of its resources and may not initiate communication with the server.

SUMMARY

The present disclosure generally describes techniques to distribute functionality from main servers to localized servers, allowing for the centralized management of peer-to-peer (P2P) for code exchange facilitation.

According to some examples, the present disclosure describes a server operable to manage a centrally managed online service. The server may include a memory configured to store instructions and may additionally include a processor coupled to the memory and configured to execute a peer-to-peer (P2P) code exchange module in conjunction with the instructions stored in the memory. A P2P code exchange module may be configured to facilitate exchange of data between a plurality of participants of the online service. The P2P code exchange module may additionally be configured to enable partial P2P data exchange by preparing P2P admission and eviction rules to determine which participants may be allowed to exchange data with other participants, preparing and deploying P2P element integration packages based on the P2P admission and eviction rules, and removing sensitive data from the exchanged P2P data.

According to other examples, the present disclosure may also describe a method for P2P code exchange facilitation in a centrally managed online service. The method may include facilitating exchange of data with a plurality of participants of the online service. The method may additionally include enabling partial P2P data exchange at a server by preparing P2P admission and eviction rules to determine which participants may be allowed to exchange data with other participants, preparing and deploying P2P element integration packages based on the P2P admission and eviction rules, and removing sensitive data from the exchanged P2P data.

According to further examples, the present disclosure may also describe a non-transitory computer readable storage medium with instructions stored thereon. When executed on one or more computing devices, the instructions may execute a method for P2P code exchange facilitation in a centrally managed online service as described herein.

The foregoing summary is merely illustrative and is not intended to be in any way limiting. In addition to the illustrative aspects, examples, and features described above, further aspects, examples, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and not to be considered limiting of its scope, the disclosure will be described with additional specificity and detail through use of the accompanying drawings, in which:

DETAILED DESCRIPTION

Figure 1:
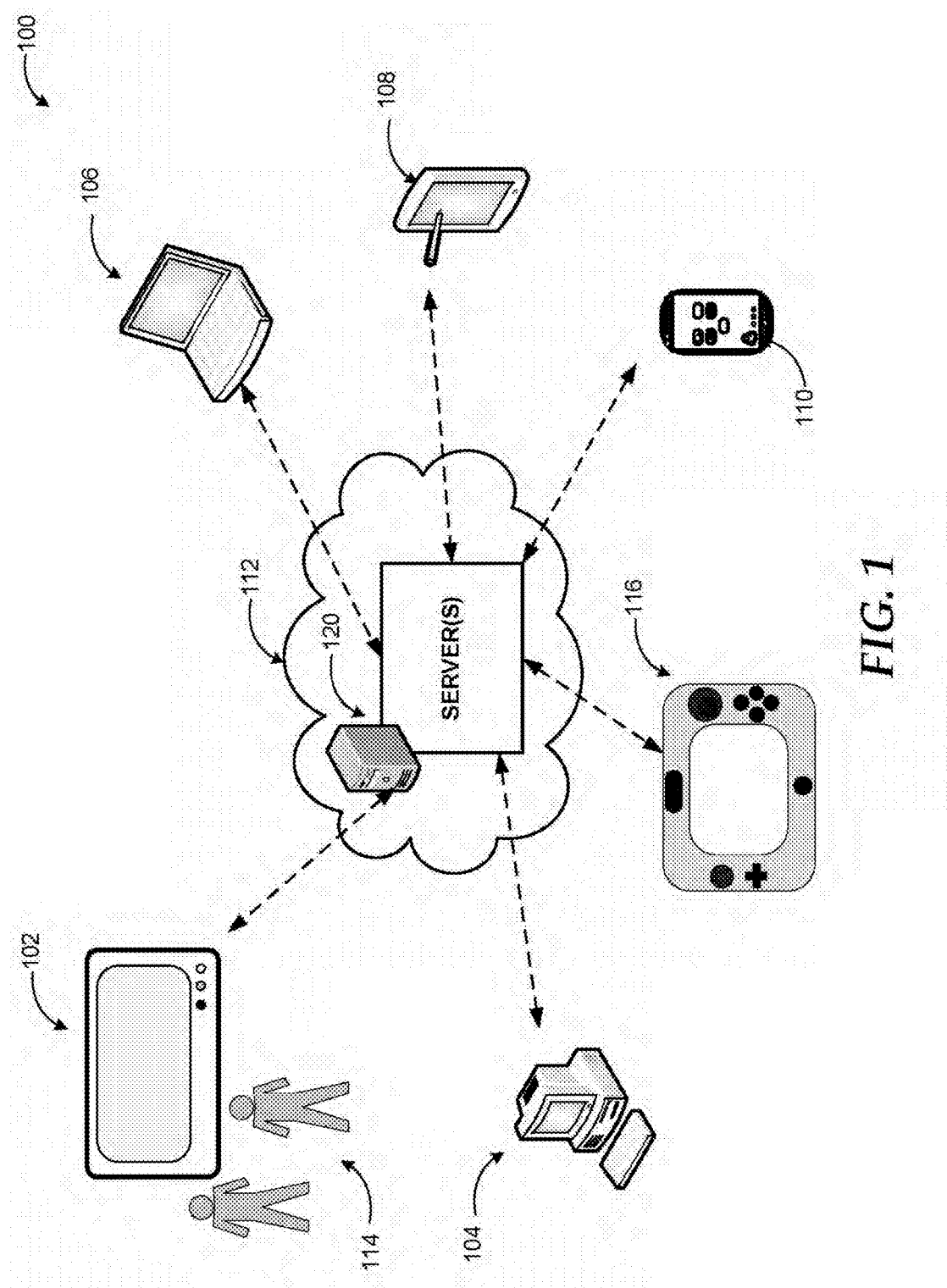
FIG. 1 illustrates an example communication environment, where real-time data exchange between one or more participants in a centrally managed online service may be implemented.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. A person having ordinary skill in the art may readily understand that the aspects of the present disclosure, as generally described herein, and illustrated in the Figures, can be arranged, substituted, combined, separated, and designed in a wide variety of different configurations, all of which may be explicitly contemplated herein.

The present disclosure is generally drawn, inter alia, to techniques, apparatus, systems, devices, and/or computer program products related to P2P code exchange facilitation in a centrally managed online service.

Briefly stated, technologies are generally provided for a hybrid architecture of an enhanced networked environment implementing a centralized management of peer-to-peer (P2P) code exchange for secure real-time content distribution. In some examples, central game servers in a massively multiplayer online game (MMOG) service may prepare both P2P admission and eviction planning and P2P element integration packages, instructing a game client whom to send data to while also removing exploitable data from the P2P channel. Thus, large amounts of data may be offloaded from a datacenter hosting an MMOG or similar service involving high numbers of users to P2P connections.

FIG. 1 illustrates an example communication environment, where real-time data exchange between one or more participants in a centrally managed online service may be implemented, arranged in accordance with at least some examples described herein.

As shown in a diagram 100, a real-time data exchange service such as, by way of example, a massively multiplayer online game (MMOG) service may enable exchange of data among a large number of client devices, facilitated by one or more servers 120 within a network 112 (e.g., cloud). Depending on a type of the service, the client devices may be of a wide-ranging variety such as a wall-mount computer 102, a desktop computer 104, a laptop computer 106, a tablet 108, a smart phone 110, or a game console 116. In some cases, a client device such as the wall-mount computer 102 may be used by multiple people 114 necessitating delivery of multiple streams of data to and from the client device.

P2P code management may be used by servers in an online service, for example, in a massively multiplayer online game (MMOG). MMOGs may be played by participants accessing servers, where one server may handle, for example, 10,000-12,000 players, with 4,000-5,000 participants active simultaneously. As such, MMOGs generally divide the game among several servers. P2P structure may also be used for distributing webcam video among a small numbers of participants. Other attempts in personalizing MMOGs integrate a participant's face onto video games on stationary consoles, including adding accessories and replacing the participants' face with a characters' face. The participant's face and a character's face may have the ability to mimic facial expressions and movements. Such attempts may fail at a scale of large numbers of players associated with MMOGs.

Data delivery to and from the client devices may be managed by the servers 120 in a system according to embodiments. For example, in the example case of the MMOG service, a server may manage communication parameters such as bandwidth, quality of service, and comparable ones. Another server may manage static data such as game scene backgrounds, player information, and similar data. Yet another server may manage dynamic data such as player actions, character motions, and so on. In an MMOG or a similar service, player interactions may be presented to other players. That is, one player's character's movements may be displayed for another player, or two or more players' characters' actions may be combined and displayed to those players to create the perception that they are acting together in a game scene. There are many aspects of computer games, as well as augmented reality applications that are constantly under development to make the players' experiences seem closer to reality. For example, game characters may be created with features similar to a player's characteristics (e.g., facial features, body features, etc.). To make the experience even more realistic, a still image or video capture of a player's face may be integrated with that player's game character (avatar). However, in a centrally managed service such as the one shown in the diagram 100, the burden of processing and transferring such data among high number of client devices may make it impractical if not impossible.

Peer-to-peer (P2P) architecture is one efficient way for transportation of data among a large number of players, especially if some of that data is generated at the players. However, P2P may be difficult to use for any information that may affect a game if corrupted, because cheaters may use such information and write software to detect or change information to their advantage. Even relative position and the information of who is sharing data with whom may be used to extract information on potential target location. Furthermore, security of exchanged information may be harder to implement compared to centrally managed service architectures.

Figure 2:
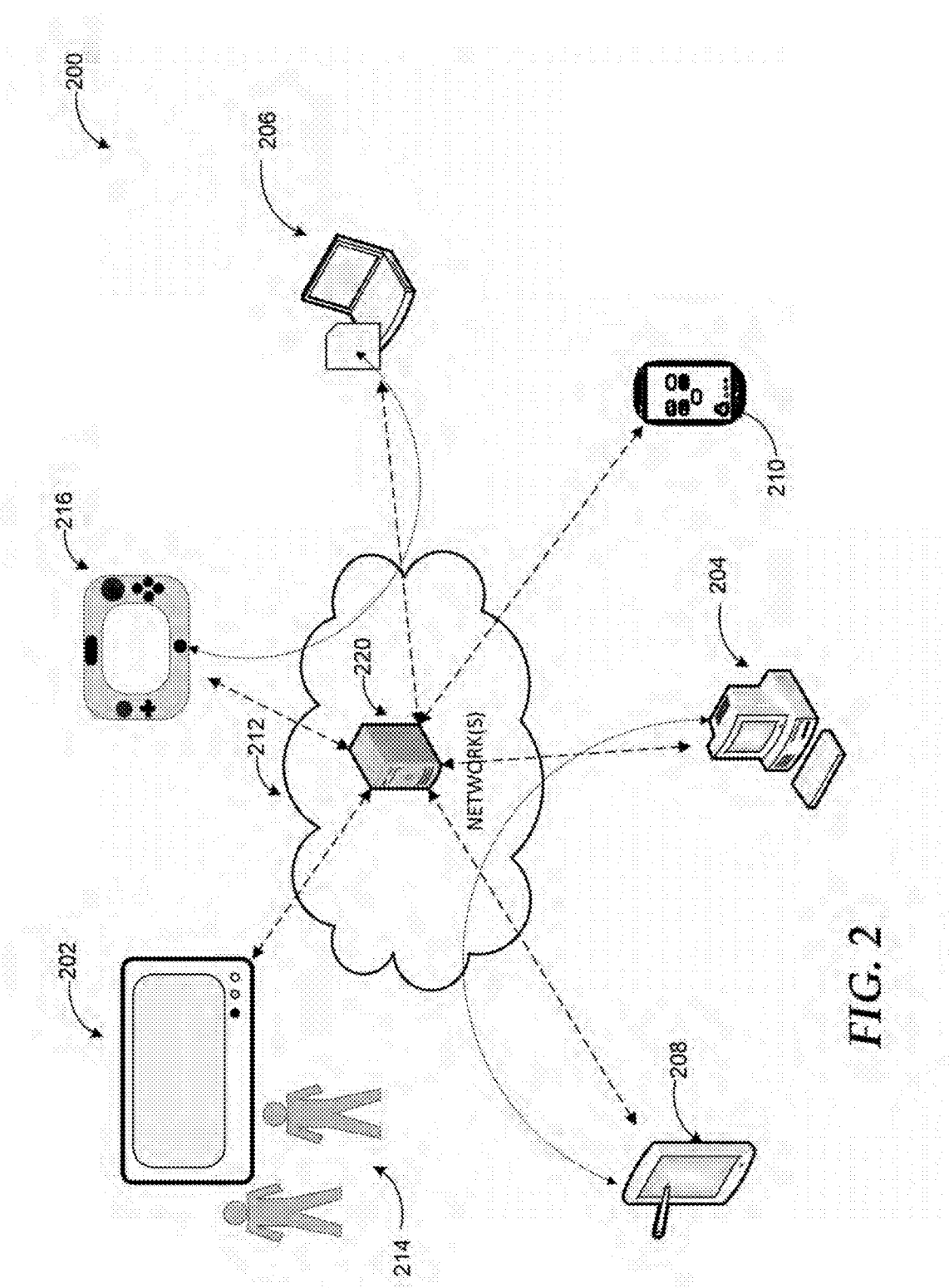
FIG. 2 illustrates an example networked environment, where centralized management of peer-to-peer (P2P) for code exchange facilitation may be implemented.

FIG. 2 illustrates an example networked environment, where centralized management of peer-to-peer (P2P) for code exchange facilitation may be implemented, arranged in accordance with at least some examples described herein.

As shown in a diagram 200, a service (e.g., an MMOG service) with centralized management of P2P for code exchange facilitation may include one or more servers 220 each configured to manage exchange of data among a high number of client devices through one or more networks 212. Examples of the client devices may include a wall-mount computer 202, a desktop computer 204, a laptop computer 206, a tablet 208, a smart phone 210, or a game console 216. In some cases, a client device such as the wall-mount computer 202 may be used by multiple people 414 involving delivery of multiple streams of data to and from the client device.

In a system implementing P2P, a distributed application architecture may distribute tasks between client devices. The client devices may share a portion of their resources such as memory, disk space, and network bandwidth with other client devices in the network without direct coordination from a central server. The P2P based exchange is represented in the diagram 200 by the double arrows between the client devices 206 and 216, as well as the client devices 204 and 208. Centralized exchanges are represented by the dashed, double arrows between the client devices and the server(s) 220.

In a system according to some embodiments, a hybrid combination of P2P and centralized management may be employed to exchange data among participants (the client devices 202, 204, 206, 208, 210, and 216, for example). Through the hybrid approach, the benefits of P2P distribution, such as distribution of vast amounts of live video images between users, may be realized while reducing or eliminating the weaknesses that typically make such approaches infeasible for MMOGs or similar services. In particular, P2P distribution may make a live video element from a scaling challenge a low-cost P2P element with substantially low network traffic burden for the game operator.

In additional examples, an example networked communication environment may implement a facilitation of a P2P real-time face distribution data exchange in a centrally managed client-server model. The client devices may also facilitate advanced functionality including the data transfer of live video feed. An example implementation may include using live video feed to represent a participant's face in an MMOG. In other examples, the use of live video feed may represent the face derived from the participant's true face in an MMOG.

While the example systems in FIG. 1 and FIG. 2 have been described with specific components such as the central server and specific client devices, examples may not be limited to the given systems of the example components and configurations. A communication environment for facilitation of real-time face distribution data exchange in a centrally managed client-server architecture may be implemented in other systems and configurations employing fewer or additional components. Furthermore, such systems do not have to be enhanced communication environments integrating various communication modes.

Figure 3:
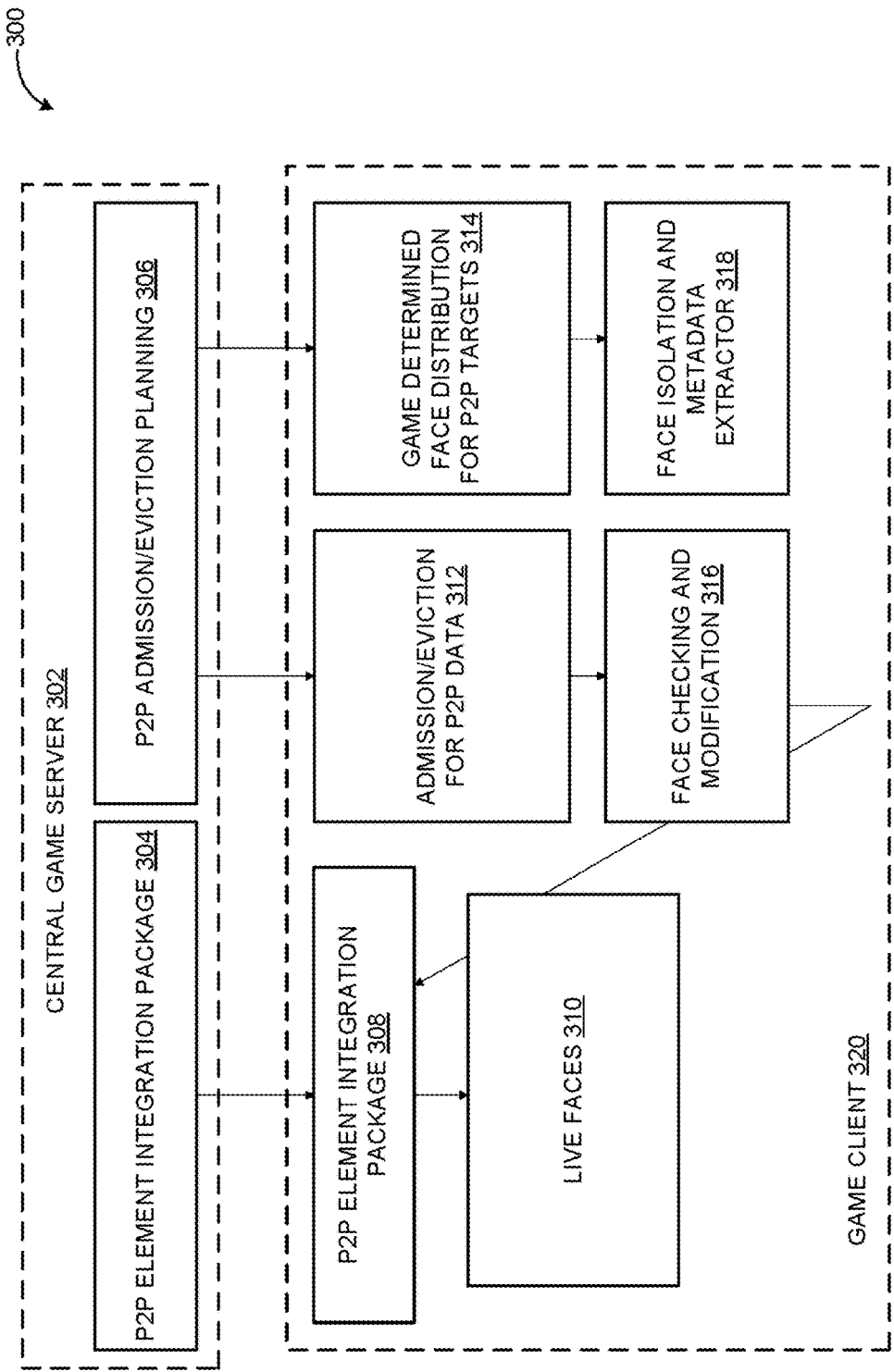
FIG. 3 illustrates a schematic of an example P2P code exchange.

FIG. 3 illustrates a schematic of an example P2P code exchange, arranged in accordance with at least some examples described herein.

As shown in a diagram 300, a hybrid architecture of P2P and central management may be employed to leverage P2P real-time content distribution while maintaining control and security. In one particular example, a central game server 302 may prepare a P2P admission and eviction planning 306 and P2P element integration packages 304, informing a game client 320 about whom to send data to while also removing exploitable data from the P2P channel.

The central game server 302 may perform the P2P admission and eviction planning 306 using techniques such as world state, lines of effect, and the like to determine which players may be sending face information to which other players. The information may be purposely limited to those who need the data for display or to those who may imminently need the information for display. If the information is not displayed information such as models or images, such as world state information, the admission and eviction may be decided based on criteria relating to whom the state changes effect. That information may be delivered to the game client 320, where the information may form the basis for a face distribution 314 via P2P channels and acceptance of incoming P2P information (admission/eviction for P2P data 312). The face information being distributed may be extracted, for example, from live webcam video, and may have metadata attached at a face isolation and metadata extractor 318. The faces received in the admission/eviction for P2P data 312 may then be subjected to checking and modification 316, before being delivered to an integration process at a P2P element integration package 308. The central game server 302 may also prepare the P2P element integration package 304 for each game client 320 (each player may have a client). At the P2P element integration package 304, the faces may be dynamically warped and mapped to represent character position, viewpoint, lighting, and the like to integrate them with game visuals and provide a game with live faces 310.

The security for the exchanged data may be provided by the central game server 302 commanding P2P destinations and receptions via blocks game determined face distribution P2P targets 314 and the admission/eviction for P2P data 312. Players may not receive information on players whose data is not needed for display, so that the presence of such information cannot be used to deduce hidden players. Even if player information from currently hidden players is exchanged for faster response times, encryption and game proxies may be used to prevent information from being revealed. Encryption may serve to hide the nature of P2P data and proxies may serve to hide the origin to remove metadata, both transformations may be instructed by the central game server. Additionally, by providing raw video/face data and causing P2P element integration package 304 to be delivered from the central game server 302, the incoming data streams do not contain direction or perspective information. In comparative unsecure P2P systems, peers may often receive information about a player's location, facing, pose, appearance and the like in case the information is needed to compute data to send back.

For additional security, the central game server 302 may also distribute keys and/or operate proxies. For example, the game may distribute encryption keys and have players send out data in an anonymously encrypted form to reduce the amount of information available on networks (for example, protecting multiple players on the same local area network 'LAN' from each other). Client systems may be given only one portion of encryption keys such that they can only encrypt the data and not decrypt it and encryption may go through multiple layers at multiple clients in some cases so that even collaboration will not identify the origin of encrypted data. This allows the server to distribute decryption keys dependent on events. In some examples, this allows data to be delivered and cached at a client over P2P channels but not have meaning unless the a player takes certain actions that trigger a need for the data. In some types of data such as world state, the data may not be judged valid unless additional information or updates are provided by the server. One or more proxies set up near large player concentrations simply by launching a proxy in an appropriate datacenter may also result in proxied P2P or by using P2P nodes as proxies for each other may hide network origin and destination information, still without burdening the game datacenter.

At the face checking and modification 316, accessories like helmets, sunglasses, or armor may be added to the faces. The addition of such accessories to live face video at the destination before rendering instead of at the source may add to the security of exchanged data. Thus, extraction of information from accessory visuals may be prevented if a player may not yet have such information. In some examples, image filtering and a function for reporting inappropriate information may also be provided, either or both of which may trigger a sample image from the face checking and modification 316 to be sent to the central game server 302 for review. An image filter, for example, may decide that if a face cannot be detected to within a certain probability, a model face or static image of the last valid face may be used. This way, participants may be prevented from submitting inappropriate images as their character "face", for example.

Central real-time face distribution systems may entail sending a video from the user to the central server and then from the central server back to each user who needs it, which may typically take longer than P2P distribution. Thus, a hybrid architecture according to some embodiments may not only provide cost-effectiveness and be more buildable than central video redistribution, but may be faster.

While some example embodiments have been described using face or similar characteristic exchange in MMOGs, embodiments are not limited to those. Embodiments may be implemented in any real-time data exchange system using the principles described herein.

Figure 4:
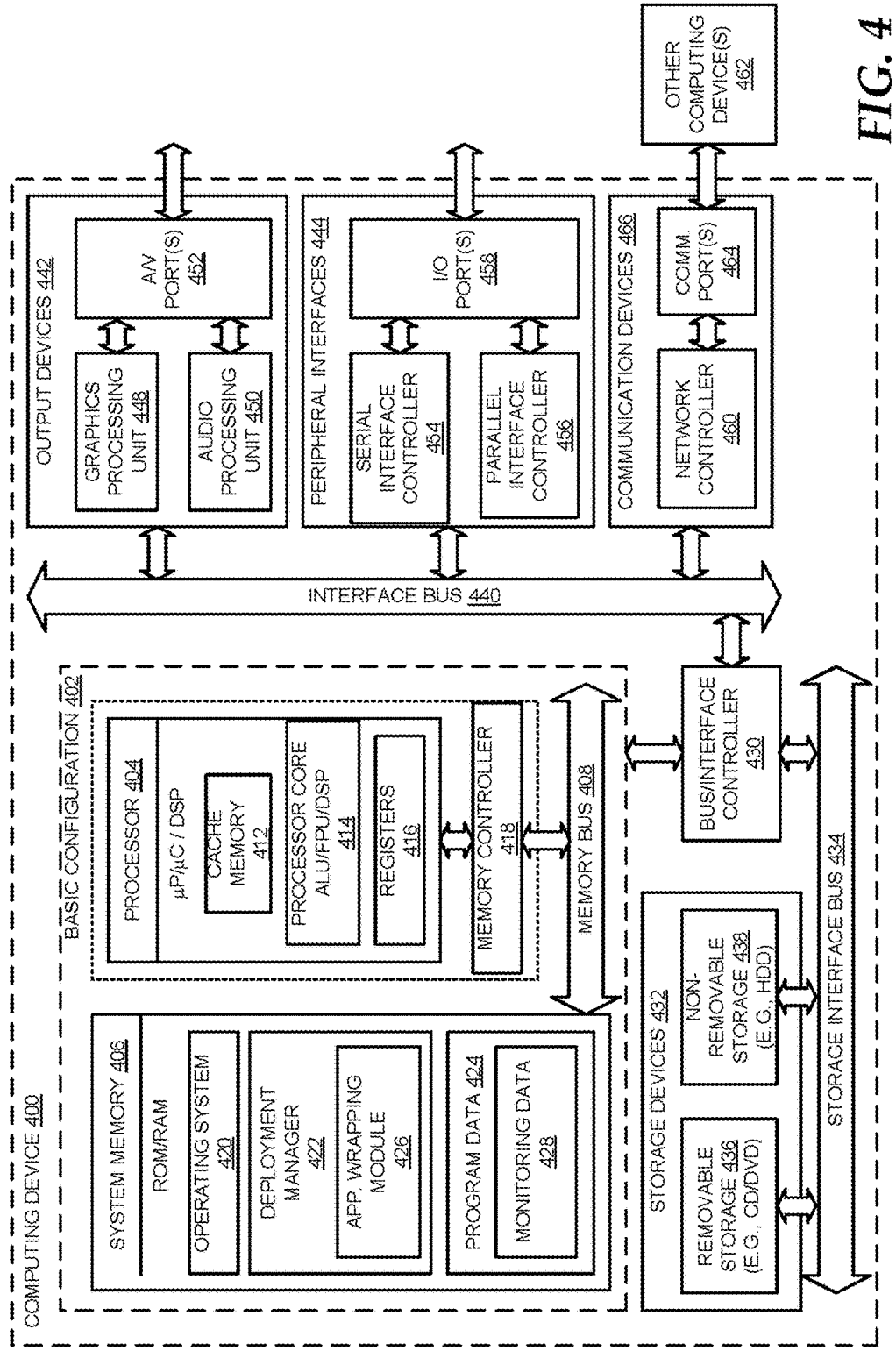
FIG. 4 illustrates a general purpose computing device, which may be used for P2P code exchange facilitation in a centrally managed online service.

FIG. 4 illustrates a general purpose computing device, which may be used for P2P code exchange facilitation in a centrally managed online service, arranged in accordance with at least some examples described herein.

For example, the computing device 400 may be used as a server, desktop computer, portable computer, smart phone, gaming console, special purpose computer, or similar device. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a level cache memory 412, one or more processor cores 414, and registers 416. The example processor cores 414 may (each) include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, a deployment manager 422, program data 424, an application wrapping module 426, and monitoring data 428. The deployment manager 422 may include an application wrapping module 426, which may be an integral part of the deployment manager 422 or a separate application. The application wrapping module 426 may facilitate receiving identification information for managing a centrally managed online service to execute the P2P code exchange module with the instructions stored in the memory, where the P2P code exchange module facilitates an exchange of data between one or more participants in an online service and enables partial P2P data exchange, as described herein. The program data 424 may include, among other data, monitoring data 428 related to P2P code exchange facilitation in a centrally managed online service, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any technique or technology for storage of information, such as computer readable instructions, data structures, program modules, or other data.

The system memory 406, the removable storage devices 436 and the non-removable storage devices 438 may be examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 466 includes a network controller, which may be arranged to facilitate communications with one or more other computing devices over a network communication link via one or more communication ports 454. The one or more other computing devices may include servers, client devices, smart appliances, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of the signals characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include storage media and communication media.

The computing device 400 may be implemented as a part of a general purpose or specialized server, mainframe, or similar computer that includes any of the above functions. The computing device 400 may also be implemented as a personal computer including laptop computer and non-laptop computer configurations.

Example examples may also include techniques. These techniques can be implemented in any number of ways, including the structures described herein. One such way may be by machine operations, of devices of the type described in the present disclosure. Another optional way may be for one or more of the individual operations of the techniques to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 5:
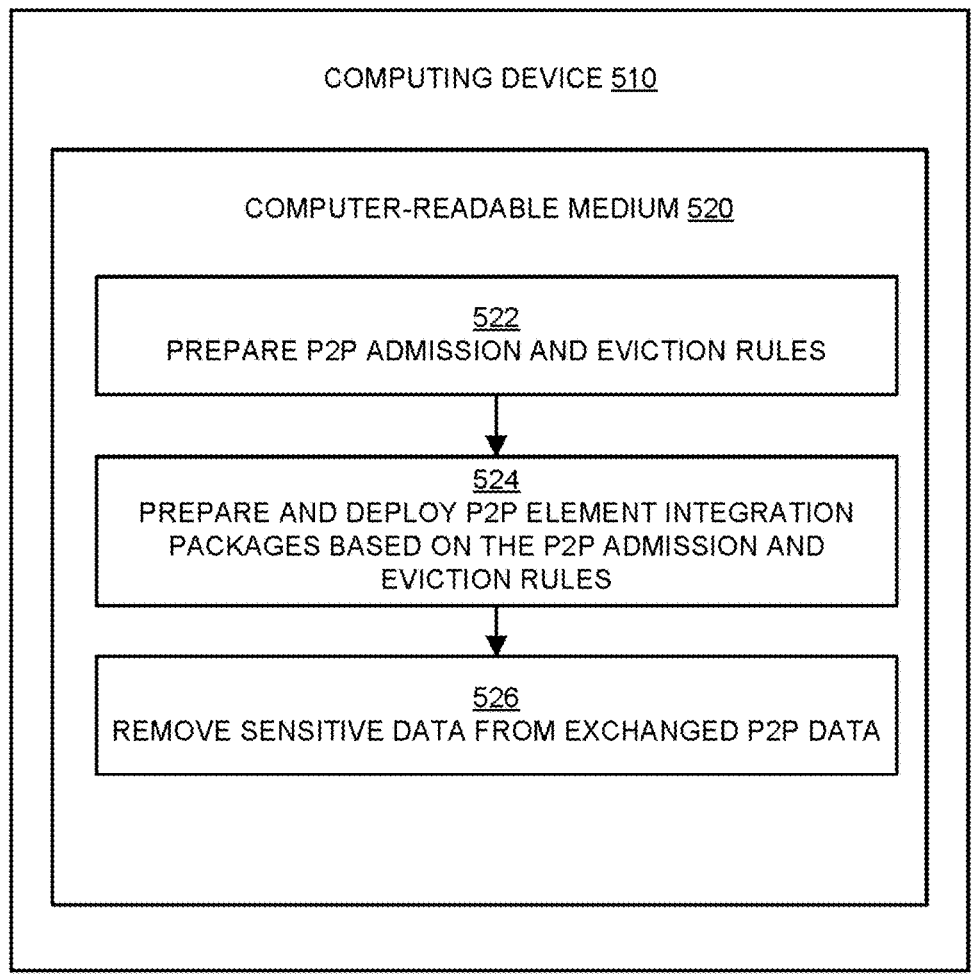
FIG. 5 is a flow diagram illustrating an example technique for P2P code exchange facilitation in a centrally managed online service and may be performed by a computing device such as the computing device in FIG. 4.

FIG. 5 is a flow diagram illustrating an example technique that may be performed by a computing device such as the computing device in FIG. 4, arranged in accordance with at least some examples as described herein.

Example techniques may include one or more operations, functions or actions as illustrated by one or more of blocks 522, 524, and 526. The operations described in the blocks 522 through 526 may also be stored as computer-executable instructions in a computer-readable medium such as a computer-readable medium 520 of a computing device 510.

An example process for facilitating P2P code exchange in a centrally managed online service may begin with block 522, "PREPARE P2P ADMISSION AND EVICTION RULES," where a P2P code exchange module may be configured to enable partial P2P data exchange by preparing P2P admission and eviction rules to determine which participants may be permitted to exchange data with other participants.

In other examples, the P2P data exchange may remove the sensitive data from the exchanged P2P data. In some examples, the P2P data exchange may protect the sensitive data through the distribution of encryption keys to have participants send out the exchanged P2P data in an anonymously encrypted format. In an additional example, the P2P data exchange may protect the sensitive data through the use of one or more proxies configured near large participant concentrations to hide network origin and destination information.

Block 522 may be followed by block 524, "PREPARE AND DEPLOY P2P ELEMENT INTEGRATION PACKAGES BASED ON THE P2P ADMISSION AND EVICTION RULES," where the P2P element integration module may be additionally configured to integrate metadata to the exchanged P2P data prior to distribution to additional participants. The terms P2P element integration module and P2P element integration packages may be used interchangeably herein.

In some examples, the P2P element integration module may assess potential threat agents, threats, and weaknesses in relation to potential hacking. According to an additional example, the P2P element integration module may receive one or more raw video data and facial data information, where the data streams from the P2P element integration package preparation module 304 from FIG. 3 may not contain direction, perspective information, and the like.

Block 524 may be followed by block 526, "REMOVE SENSITIVE DATA FROM EXCHANGED P2P DATA," where the server may be configured to employ data filtering and a reporting function to report inappropriate information. The reporting function of the P2P code exchange module may be configured to trigger sample data to be sent to the server for review.

In an additional example, the participants' facial information may be further processed by employing an image filter to determine whether a face may be detected to within a predefined probability and in response to a determination that the face cannot be detected to within the predefined probability, employ one of a model face or a static image of a last valid face.

The blocks included in the above-described process may be for illustration purposes. Employing P2P code exchange facilitation in a centrally managed online service may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 6:
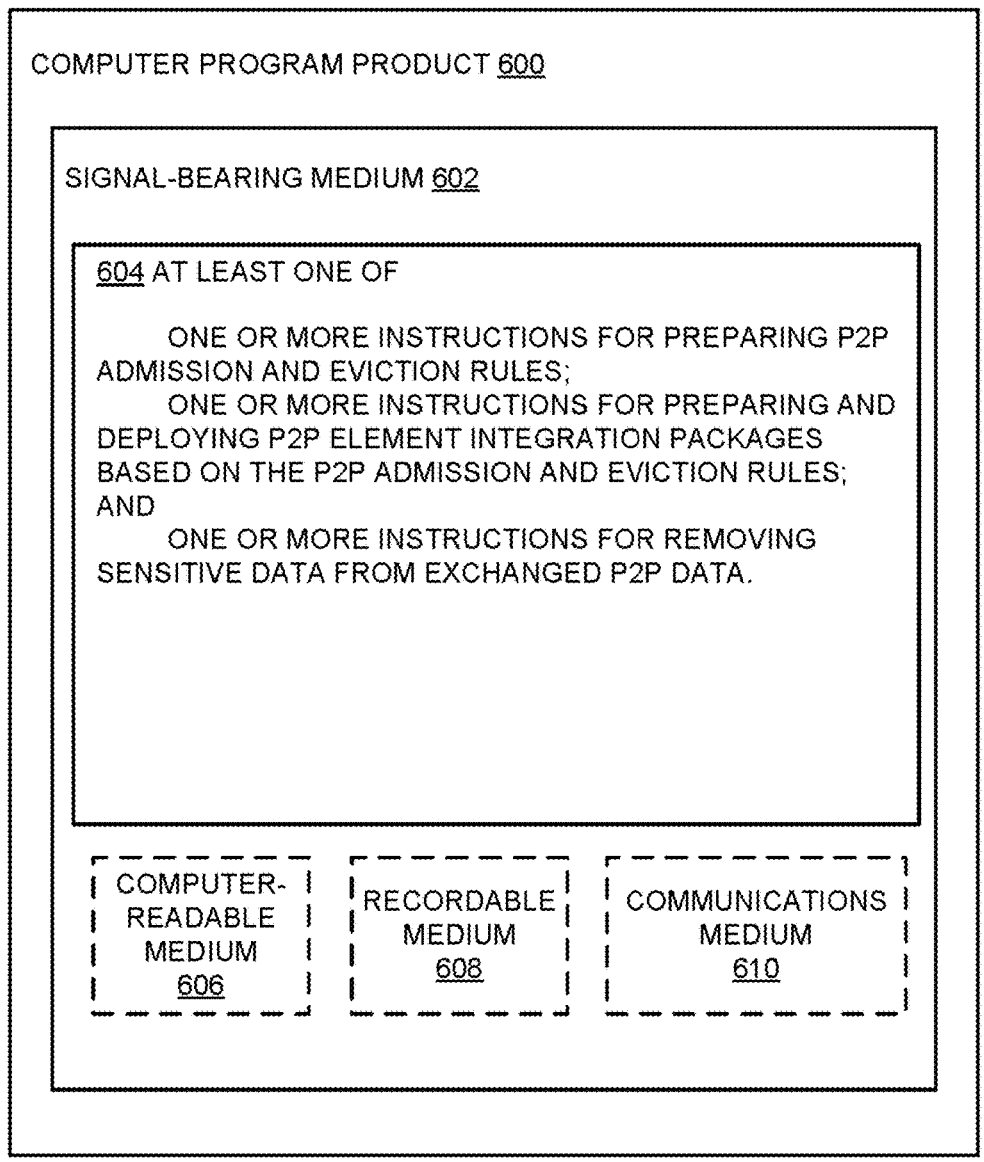
FIG. 6 illustrates a block diagram of an example computer program product, all arranged in accordance with at least some examples described herein.

FIG. 6 illustrates a block diagram of an example computer program product, arranged in accordance with at least some examples as described herein.

In some examples, as shown in FIG. 6, the computer program product 600 may include a signal bearing medium 602 that may also include one or more machine readable instructions 604 that, when executed by, for example, a processor may provide the functionality described herein. For example, referring to the processor 404 in FIG. 4, an application wrapping module 426 executed on the processor 404 may undertake one or more of the tasks shown in FIG. 4 in response to the instructions 604 conveyed to the processor 404 by the signal-bearing medium 602 to perform actions associated with P2P code exchange facilitation in the centrally managed online service. Some of those instructions may include, for example, instructions to prepare P2P admission and eviction rules, instructions to prepare and deploy P2P element integration packages based on the P2P admission and eviction rules, and instructions to remove sensitive data from exchanged P2P data according to some examples described herein.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing, medium 602 may encompass a recordable medium 608, such as, but not limited to, memory, read/write (R/W) CDs R/W DVDs, etc. In some implementations, the signal bearing medium 602 may encompass a communications medium 610, such as, but not limited to, a digital and/or an analog communication medium (for example, a fiber optic cable, a waveguide, a wired communications link, a wireless communication link, etc.). For example, the program product 600 may be conveyed to one or more modules of the processor 404 of FIG. 4 by an RF signal bearing medium, where the signal bearing medium 602 is conveyed by the wireless communications medium 610 (for example, a wireless communications medium conforming with the IEEE 802.11 standard).

According to some examples, the present disclosure may describe a server operable to manage a centrally managed online service. The server may include a memory configured to store instructions and may additionally include a processor coupled to the memory and configured to execute a peer-to-peer (P2P) code exchange module in conjunction with the instructions stored in the memory. A P2P code exchange module may be configured to facilitate exchange of data between one or more participants of the online service. The P2P code exchange module may additionally be configured to enable partial P2P data exchange by preparing P2P admission and eviction rules, to determine which participants may be allowed to exchange data with other participants, preparing and deploying P2P element integration packages based on the P2P admission and eviction rules, and removing sensitive data from the exchanged P2P data.

According to additional examples, the P2P code exchange module of the server may be further configured to add metadata to the exchanged P2P data prior to distribution to the other participants. Additionally, the P2P code exchange module of the server may be further configured to control when participants have access to the exchange P2P data. The P2P code exchange module of the server may be further configured to prepare a P2P element integration package for the participant and control which participants may receive the exchanged P2P data.

According to some examples, the P2P code exchange module of the server may be further configured to protect, the sensitive data through distribution, of encryption keys to have participants send out the exchanged P2P data, in an anonymously encrypted form. Additionally, the P2P code exchange module of the server may be further configured to protect the sensitive data through use of one or more proxies configured near large participant concentrations to hide network origin and destination information.

According to additional examples, the P2P code exchange module of the server may be further configured to employ data filtering and a reporting function to report inappropriate information. The reporting function of the server may be further configured to trigger sample data to be sent to the server for review. The centrally managed online service of the server may be an MMOG. According to additional examples, the server may be a central game server. The exchanged P2P data exchange of the server may include participant face information to be integrated with game characters.

According to some, examples, the P2P code exchange module of the server may be further configured to extract the participant face information from a live webcam video stream. Additionally, the P2P code exchange module of the server may be further configured to process the participant face information for integration into a game infrastructure. The P2P code exchange module of the server may be further configured to dynamically warp and map the participant face information to represent one or more of a character position, a viewpoint, and a lighting.

According to some examples, the P2P code exchange module of the server may be further configured to process the participant face information to add one or more accessories at a destination client device prior to rendering. Additionally, the P2P code exchange module of the server may be further configured to deliver raw video and/or face data and an integrations package to receiving participants without direction or perspective information.

According to further examples, the P2P code exchange module of the server may be further configured to employ an image filter to determine whether a face can be detected within a predefined probability and in response to a determination that the face cannot be detected to within the predefined probability, employ one of a model face or a static image of a last valid face.

According to some examples, the present disclosure may describe a method for P2P code exchange facilitation in a centrally managed online service. The method may include facilitating exchange of data with one or more participants of the online service. The method may additionally include enabling partial P2P data exchange at a server by preparing P2P admission and eviction rules to determine which participants may be allowed to exchange data with other participants. According to further examples, the method may include preparing and deploying P2P element integration packages based on the P2P admission and eviction rules and removing sensitive data from the exchanged P2P data.

According to further examples, the method may include adding metadata to the exchanged P2P data prior to distribution to the other participants. The method may additionally include controlling when participants have access to the exchange P2P data. The method may further include preparing a P2P element integration package for the participant and controlling which participants may receive the exchanged P2P data.

According to some examples, the method may further include protecting the sensitive, data through distribution of encryption keys to have participants send out the exchanged P2P data in an anonymously encrypted form. The method may additionally include protecting the sensitive data through use of one or more proxies configured near large participants concentrations to hide network origin and destination information.

According to some examples, the method may include, employing data filtering and a reporting function to report inappropriate information. According to some examples, the reporting function of the method may be configured to trigger sample data to be sent to the server for review. The centrally managed online service of the method may be an MMOG. According to some examples, the server of the method may be a central game server. The exchanged P2P data of the method may include participant face information to be integrated with game characters. The method may further include extracting, the participant face information from a live webcam video stream. According to some examples, the method may further include processing the participant face information for integration into a game infrastructure.

According to some examples, the method may further include dynamically warping and mapping the participant face information to represent one or more of a character position, a viewpoint, and a lighting. According to additional examples, the method may further include processing the participant face information to add one or more accessories at a destination client device prior to rendering. The method may include delivering raw video and/or face data and an integrations package to receiving participants without direction or perspective information.

According to some examples, the method may further include employing an image filter to determine whether a face can be detected within a predefined probability and in response to a determination that the face cannot be detected to within the predefined probability, employing one of a model face or a static image of a last valid face.

According to further examples, the present disclosure may also describe a non-transitory computer readable storage medium with instructions stored thereon. When executed on one or more computing devices, the instructions may execute a method for peer-to-peer (P2P) code exchange facilitation in a centrally managed online service as described herein.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and or firmware would be possible in light of this disclosure.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A server operable to manage a centrally managed online service in a hybrid system that leverages peer-to-peer (P2P) real-time content distribution with control and security, wherein the centrally managed online service includes a massively multiplayer online game, the server comprising:
a memory configured to store instructions; and
a processor coupled to the memory and configured to execute a P2P code exchange module in conjunction with the instructions stored in the memory, wherein the P2P code exchange module is configured to:
facilitate exchange of data between a plurality of participants of the online service;
enable partial exchange of P2P data by:
preparation of P2P admission and eviction rules to determine which participants of the plurality of participants are allowed to exchange the P2P data with other participants of the plurality of participants, wherein the exchanged P2P data includes player face data to be integrated with game characters;
preparation and deployment of P2P element integration packages based on the P2P admission and eviction rules; and
removal of sensitive data from the exchanged P2P data, wherein the removal of the sensitive data includes:
encryption of information, from currently hidden participants of the plurality of participants and which is included in the exchanged P2P data for faster response times, to hide the information from participants of the plurality of participants that are given access to the exchanged P2P data, wherein the encryption of information includes distribution of one portion of encryption keys to the participants of the plurality of participants, use of a proxy to hide, from the participants of the plurality of participants that are given the access to the exchanged P2P data, an origin of the information,
prevention of an exchange of the information of the currently hidden participants, wherein the information is unnecessary to display to the participants of the plurality of participants that are given the access to the exchanged P2P data, to prevent the information from being used to deduce the currently hidden participants,
employment of an image filter to validate the player face data based on a comparison of a value related to the player face data with a specific probability threshold value, and
in response to a determination that the value of the player face data is less than the specific probability threshold value, employment of one of a model face or a static image of a last valid face; and
control when the participants of the plurality of participants have the access to the exchange P2P data, wherein operation of the server in the hybrid system enables utilization of P2P capability for content distribution and also enables centralized security and control that is unavailable or difficult to implement in a P2P system.

2. The server of claim 1, wherein the P2P code exchange module is configured to:
prepare a P2P element integration package for each participant; and
control which participants are to receive the exchanged P2P data.

3. The server of claim 1, wherein the server includes a central game server.

4. The server of claim 1, wherein the P2P code exchange module is further configured to extract the player face data from a live webcam video stream.

5. The server of claim 1, wherein the P2P code exchange module is further configured to process the player face data for integration into a game infrastructure.

6. The server of claim 5, wherein the P2P code exchange module is further configured to dynamically warp and map the player face data to represent one or more of: a character position, a viewpoint, and a lighting.

7. The server of claim 1, wherein the P2P code exchange module is further configured to process the player face data to add one or more accessories at a destination client device prior to rendering.

8. The server of claim 1, wherein the P2P code exchange module is further configured to deliver raw video and/or the player face data and an integrations package to recipient players without direction or perspective information.

9. A method for peer-to-peer (P2P) code exchange facilitation in a centrally managed online service in a hybrid system that leverages P2P real-time content distribution with control and security, wherein the centrally managed online service includes a massively multiplayer online game, the method comprising:
at a server, facilitating exchange of data with a plurality of participants of the online service; and
while facilitating the exchange of data with the plurality of participants of the online service, enabling partial exchange of P2P data by:
preparing P2P admission and eviction rules to determine which participants of the plurality of participants are allowed to exchange the P2P data with other participants of the plurality of participants, wherein the exchanged P2P data includes player face data to be integrated with game characters;

preparing and deploying P2P element integration packages based on the P2P admission and eviction rules; and removing sensitive data from the exchanged P2P data, wherein removing the sensitive data includes:
encrypting information, from currently hidden participants of the plurality of participants and which is included in the exchanged P2P data for faster response times, to hide the information from participants of the plurality of participants that are given access to the exchanged P2P data;
using a proxy to hide, from the participants of the plurality of participants that are given the access to the exchanged P2P data, an origin of the information;
preventing an exchange of the information of the currently hidden participants, wherein the information is unnecessary to display to the participants of the plurality of participants that are given the access to the exchanged P2P data, to prevent the information from being used to deduce the currently hidden participants;
employing data filtering and a reporting function to report inappropriate information, wherein the reporting function is configured to trigger sample data to be sent to the server for review, wherein employing the data filtering and the reporting function includes employing an image filter to validate the player face data based on a comparison of a value related to the player face data with a specific probability threshold value; and
in response to a determination that the value of the player face data is less than the specific probability threshold value, employing of one of a model face or a static image of a last valid face, wherein operation of the server in the hybrid system enables utilization of P2P capability for content distribution and also enables centralized security and control that is unavailable or difficult to implement in a P2P system.

10. The method of claim 9, further comprising:
adding metadata to the exchanged P2P data prior to distribution to the other participants.

11. The method of claim 9, wherein preparing and deploying the P2P element integration packages include:
preparing a P2P element integration package for each participant; and
controlling which participants are to receive the exchanged P2P data.

12. The method of claim 9, wherein the server includes a central game server.

13. The method of claim 9, further comprising:
extracting the player face data from a live webcam video stream.

14. The method of claim 9, further comprising:
processing the player face data for integration into a game infrastructure.

15. The method of claim 14, further comprising:
dynamically warping and mapping the player face data to represent one or more of: a character position, a viewpoint, and a lighting.

16. The method of claim 9, further comprising:
delivering raw video and/or the player face data and an integrations package to recipient players without direction or perspective information.

17. A hybrid computer system that leverages peer-to-peer (P2P) real-time content distribution with control and security, the hybrid computing system comprising:
at least one server operable to manage a centrally managed online service, wherein the centrally managed online service includes a massively multiplayer online game, wherein the at least one server is configured to:
facilitate exchange of data between a plurality of participants of the online service;
enable partial exchange of P2P data by:
preparation of P2P admission and eviction rules to determine which participants of the plurality of participants are allowed to exchange the P2P data with other participants of the plurality of participants, wherein the exchanged P2P data includes player face data to be integrated with game characters;
preparation and deployment of P2P element integration packages based on the P2P admission and eviction rules; and
removal of sensitive data from the exchanged P2P data, wherein the removal of the sensitive data includes:
encryption of information, from currently hidden participants of the plurality of participants and which is included in the exchanged P2P data for faster response times, to hide the information from participants of the plurality of participants that are given access to the exchanged P2P data,
use of a proxy to hide, from the participants of the plurality of participants that are given the access to the exchanged P2P data, an origin of the information,
prevention of an exchange of the information of the currently hidden participants, wherein the information is unnecessary to display to the participants of the plurality of participants that are given the access to the exchanged P2P data, to prevent the information from being used to deduce the currently hidden participants,
employment of an image filter to validate the player face data based on a comparison of a value related to the player face data with a specific probability threshold value, and
in response to a determination that the value of the player face data is less than the specific probability threshold value, employment of one of a model face or a static image of a last valid face; and
control when the participants of the plurality of participants have the access to the exchange P2P data, wherein operation of the at least one server in the hybrid system enables utilization of P2P capability for content distribution and also enables centralized security and control that is unavailable or difficult to implement in a P2P system.

* * * * *